Jan. 5, 1965 M. W. LATHERS ETAL 3,164,103
HIGH SPEED TRANSIT SYSTEM AND VEHICLE THEREFOR
Filed April 2, 1963 2 Sheets-Sheet 1

INVENTORS
Michael W. Lathers,
BY & David M. Lyon

W. F. Wagner
ATTORNEY

Jan. 5, 1965    M. W. LATHERS ETAL    3,164,103
HIGH SPEED TRANSIT SYSTEM AND VEHICLE THEREFOR
Filed April 2, 1963    2 Sheets-Sheet 2

INVENTORS
Michael W. Lathers,
BY & David M. Lyon
W. F. Wagner
ATTORNEY

United States Patent Office 3,164,103
Patented Jan. 5, 1965

3,164,103
HIGH SPEED TRANSIT SYSTEM AND
VEHICLE THEREFOR
Michael W. Lathers, Birmingham, Mich., and David M. Lyon, La Grange, Ill., assignors to General Motors Corporation, Detroit Mich., a corporation of Delaware
Filed Apr. 2, 1963, Ser. No. 269,904
11 Claims. (Cl. 104—134)

This invention relates to ground effect supported land vehicles and guidance and propulsion means therefor.

The invention is concerned primarily with a transit system utilizing a single or articulated chain of vehicles which are supported by relatively large area low unit loading air bearings and more particularly air bearings of the type capable of operating over relatively crudely prepared roadbeds.

As used herein, the expression "low unit loading air bearing" is intended to denote an air bearing operating at air pressure up to approximately two atmospheres above ambient pressure.

An object of the invention is to provide an improved transit system.

Another object is to provide a system and vehicle for high speed land transportation characterized by smooth and silent operation.

A further object is to provide a transit system utilizing vehicle load supporting structure which substantially eliminates friction relative to the supporting surface.

A still further object is to provide a transit system wherein a substantially flat road surface is provided with a vertically projecting rail defining a path of movement for the vehicle, the vehicle being provided with one or more low unit loading air bearing structures at each side of the rail which support the vehicle in frictionless spaced relation from the road, propulsion, lateral stability and guidance being accomplished by driven wheels mounted on the vehicle for rotation on vertical axes which are yieldably urged into sidewise abutting engagement with the rails.

Still another object is to provide an arrangement of the type described wherein the propulsion and support media are electrically operated and the required electrical energy therefor is derived from power pick-up strips associated with the rail.

A still further object is to provide an arrangement of the type described wherein the air bearing supporting structures comprise flexible plenum chamber low pressure air bearings providing elastic support as well as operating to sustain the vehicle in frictionless relation with the roadbed.

These and other objects, advantages and features of the invention will become more fully apparent as reference is had to the accompanying specification and drawings wherein.

Figures 1, 2:
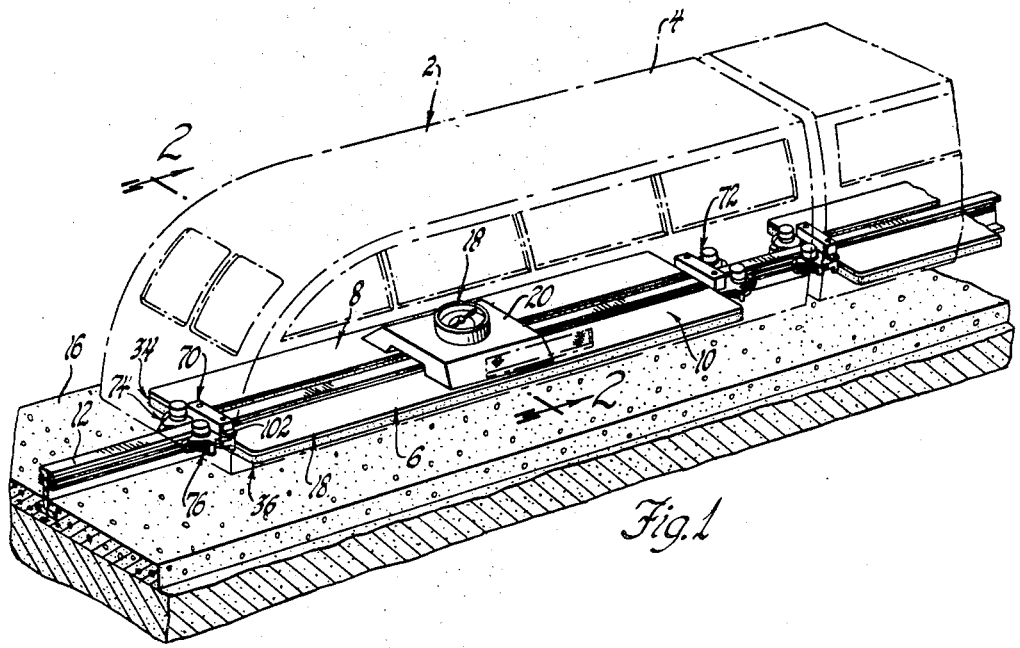
FIGURE 1 is a partially phantom schematic view of a transit system and vehicle in accordance with the invention.
FIGURE 2 is a front elevational view, partly in section, looking in the direction of arrows 2—2 of FIGURE 1.

Referring now to the drawings and particularly FIGURES 1 and 2, the reference numeral 2 generally designates one of a plurality of articulated passenger or cargo carrying cars typical of rapid transit systems. Car 2 includes a body structure 4 mounted on an undercarriage assembly 6 which extends throughout substantially the entire length of the car. In the illustrated embodiment, undercarriage 6 includes a pair of parallel longitudinally extending load supporting runners 8 and 10 which are disposed in straddling relation to an I beam or rail 12, the base of which is embedded in a roadbed 16. In accordance with one feature of the invention, roadbed 16 may be formed by applying a relatively thin layer of finished material such as asphalt or concrete over the ground, by compacting asphalt treated earth, or by utilizing any other medium capable of supporting the gross load of the vehicle when the load imposed thereby is exerted evenly over a surface area roughly comparable to the plan form area of the supported vehicle. Accordingly, runners 8 and 10 are constructed and arranged relative to roadbed 16 so as to enable establishment of a cushion of low pressure air therebetween extending over substantially the entire plan form area of each runner. A continuous supply of air for this purpose is provided by an axial flow blower assembly 18 connected in communicating relation therewith by duct 20 which bridges the rail 12.

In the preferred embodiment, the low pressure air bearings take the form of flexible plenum chamber air bearing supports of the type disclosed in copending application Serial No. 4,465, Harry A. Mackie et al., entitled "Air Cushion Device," filed January 25, 1960, and assigned to General Motors Corporation. As seen in FIGURE 2, the runners 8 and 10 form longitudinally elongated hollow box-like members 22 and 24, the lower surfaces 26 and 28 of which are provided with laterally centered longitudinally extending slots 30 and 32, the purpose of which will be described shortly. Disposed beneath each box-like member 22 and 24 are flexible diaphragms 34 and 36, the outer perimeters of which overlap and are sealed around the entire side walls 38 and 40 of the respective box-like members 22 and 24. The central portion of diaphragms 34 and 36 are secured in abutting relation with the underside of the respective lower surfaces 26 and 28 and are provided with longitudinally extending slots 42 and 44 aligned with slots 30 and 32. Diaphragms 34 and 36 are preferably shaped to provide perimetrical depending convolutions 46 and 48 so that annular cavities 50 and 52 are formed between diaphragms 34 and 36 and the respective lower surfaces 26 and 28, while plenum cavities 54 and 56 are formed between the diaphragms and roadbed 16. Outboard of slots 42 and 44, diaphragms 34 and 36 are perforated at intervals to provide apertures 58 and 60 which permit open communication between annular cavity 50 and plenum cavity 54 and annular cavity 52 and plenum cavity 56. In operation, when the axial fan 18 is energized, a high volume of low pressure air inducted through screens 62 and 64 is ejected into hollow boxes 22 and 24 through branch conduit 20 and travels through slots 30, 42 and 32, 44 into plenum cavities 54 and 56. Simultaneously, annular cavities 50 and 52 are inflated by air passing through apertures 58 and 60 with the result that the entire vehicle is elevated relative to roadbed 16 a distance equal to the depth of convolutions 46 and 48. Continued operation of fan 18 produces a low pressure cushion of air within the respective plenum cavities which discharges at a very low rate through the perimetrical throttling gaps 66 and 68 established between the lowermost portion of each depending convolution and the roadbed 16. Owing to the yieldable character of each convolution and the relatively low pressure present in annular cavities 50 and 52, the diaphragms are capable of conforming with road surface irregularities with a high degree of accuracy and therefore maintain a uniform throttling gap which reduces the rate of radial discharge of air from plenums 54 and 56 and therefore enables the low pressure air cushion therein to support the vehicle in frictionless relation with the ground with minimum expenditure of power for operating fan 18. In addition to improved compliance with minor road surface irregularities, the plenum chamber type of air bearing provides a significant degree of elastic cushioning effect in supporting the passenger compartment 4.

Figure 3:
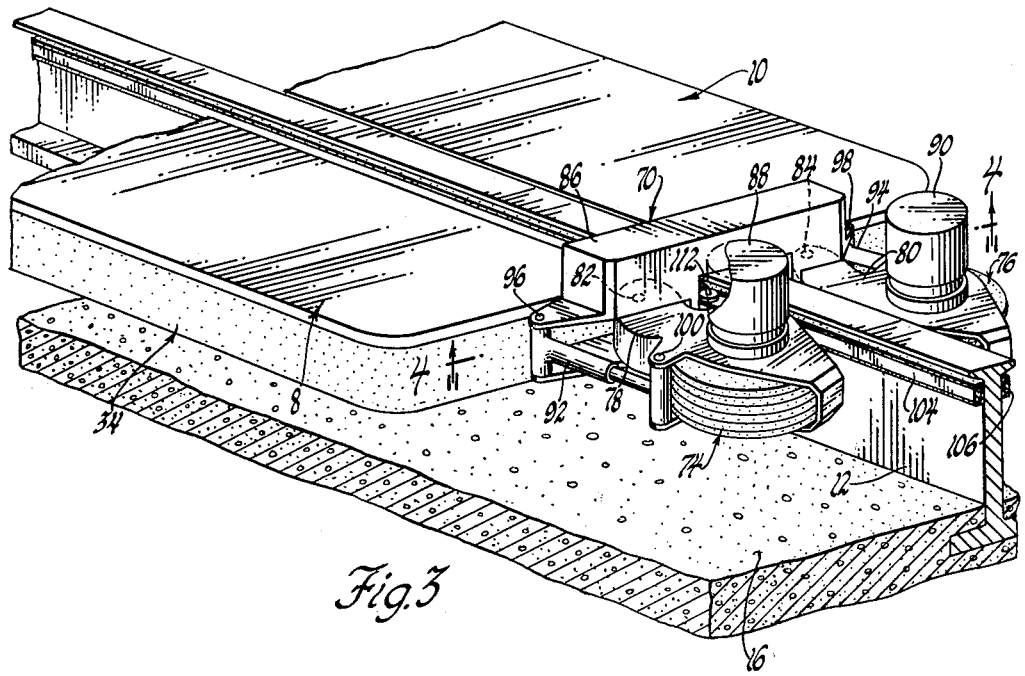
FIGURE 3 is an enlarged fragmentary perspective view of the vehicle undercarriage and associated roadbed illustrating certain details of construction.

A vehicle of the type thus far described, while elastically supported in friction free relation to the roadbed, is of course devoid of either directional stability, propulsion or guidance. According to the principal feature of the invention, stability, guidance and propulsion are provided by means of identical wheel assemblies 70 and 72 disposed at opposite ends of each vehicle. As seen best in FIGURE 3, assembly 72 comprises traction wheels 74 and 76 which are mounted at the forward ends of horizontally swingable lever arms 78 and 80 for rotation about vertically extending axes. The rearward ends of arms 78 and 80 pivot about laterally spaced vertical axes 82 and 84 formed on a support bracket 86 secured to runners 8 and 10. Electric motor means 88 and 90 are mounted coaxially with and drive wheels 74 and 76. The forward ends of arms 78 and 80 are biased toward each other to urge wheels 74 and 76 into abutting relation with opposite sides of rail 12 by telescoping compression struts 92 and 94 reacting between pivots 96 and 98 on bracket 86 and pivots 100 and 102 attached to intermediate portions of arms 78 and 80. When electric motors 88 and 90 are energized, in a manner shortly to be described, wheels 74 and 76 exert tractive effort on rail 12 and propel the entire vehicle 2 in a forward or reverse direction, as the case may be, while the compression struts act through arms 78 and 80 to maintain the vehicle in a stabilized relation laterally of track 12 and cause the vehicle to proceed in the path defined by the former. Since the entire vertical load represented by the vehicle is supported by the air bearing runners 8 and 10, wheels 74 and 76 are not called upon to overcome rolling friction. Conversely, even though the air bearings provide no directional stability, complete stability is obtained by the operation of driving and guidance assemblies 70 and 72 without loss of the benefits of complete frictionless support of the vertical load of the vehicle.

Figure 4:
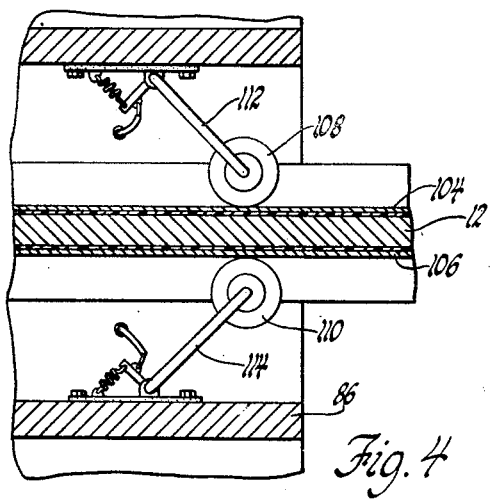
FIGURE 4 is a fragmentary enlarged plan view of FIGURE 3 illustrating details of the power pick-up.

According to another feature of the invention, as seen best in FIGURE 4, electrical energy necessary to power the electric motors 88 and 90 and fan 18 is derived from insulated embedded strips 104 and 106 mounted on opposite sides of rail 12. Each strip 104 and 106 is engaged by contact wheels 108 and 110 mounted on laterally inwardly biased lever arms 112 and 114 hinged on support bracket 86. Consequently self-contained power supply is not required.

While but one embodiment of the invention has been shown and described, it will be apparent that other changes and modifications may be made therein. It is, therefore, to be understood that it is not intended to limit the invention to the embodiment shown, but only by the scope of the claims which follow.

We claim:
1. A transit system comprising, a substantially flat roadbed, a horizontally extending vertically projecting rail secured to said roadbed, a vehicle movable over said roadbed in the path defined by said rail, said vehicle including a pair of low unit loading air bearings disposed at opposite sides of said rail in proximate relation to said roadbed, air flow generating means for energizing said air bearings to support said vehicle in frictionless spaced relation from said roadbed, driving means on said vehicle including wheels engaging said rail in laterally opposed relation, and motor means operable to impart rotation to said wheels to propel said vehicle along the path defined by said rail.

2. A transit system comprising, a substantially flat roadbed, a horizontally extending vertically projecting rail secured to said roadbed, a vehicle movable over said roadbed in the path defined by said rail, said vehicle including a pair of low unit loading air bearings disposed at opposite sides of said rail in proximate relation to said roadbed, air flow generating means for energizing said air bearings to support said vehicle in frictionless spaced relation from said roadbed, driving means on said vehicle including wheels engaging said rail in opposed relation, and motor means operable to impart rotation to said wheels to propel said vehicle along the path defined by said rail.

3. A transit system comprising, a substantially flat roadbed, a horizontally extending vertically projecting rail secured to said roadbed, a vehicle movable over said roadbed in the path defined by said rail, a pair of low unit loading air bearings disposed at opposite sides of said rail beneath said vehicle in proximate relation to said roadbed air flow generating means for energizing said air bearings to support said vehicle in frictionless spaced relation from said roadbed, driving means on said vehicle including lever mounted wheels engaging said rail in laterally opposed relation, and motor means engaging said wheels operable to impart rotation thereto to propel said vehicle along the path defined by said rail.

4. A transit system comprising, a substantially flat roadbed, a horizontally extending vertically projecting rail secured to said roadbed, a vehicle movable over said roadbed in the path defined by said rail, a pair of low unit loading air bearings disposed at opposite sides of said rail beneath said vehicle, said bearing including flexible inflatable diaphragms disposed in proximate relation to said roadbed, air flow generating means for energizing said air bearings to inflate said diaphragms and support said vehicle in frictionless spaced relation from said roadbed, driving means on said vehicle including lever mounted wheels engaging said rail in laterally opposed relation, and motor means engaging said wheels operable to impart rotation thereto to propel said vehicle along the path defined by said rail.

5. A transit system comprising, a substantially flat roadbed, a horizontally extending vertically projecting rail secured to said roadbed, a vehicle movable over said roadbed in the path defined by said rail, said vehicle including a pair of low unit loading air bearings disposed at opposite sides of said rail in proximate relation to said roadbed, air flow generating means for energizing said air bearings to support said vehicle in frictionless spaced relation from said roadbed, driving means on said vehicle including wheels engaging said rail in laterally opposed relation, motor means operable to impart rotation to said wheels to propel said vehicle along the path defined by said rail, and means associated with said driving means and said vehicle operable to stabilize said vehicle in transverse relation to said rail.

6. A transit system comprising, a substantially flat roadbed, a horizontally extending vertically projecting rail secured to said roadbed, a vehicle movable over said roadbed in the path defined by said rail, said vehicle including a pair of flexible plenum chamber type air bearings disposed at opposite sides of said rail in proximate relation to said roadbed, air flow generating means for energizing said air bearings to support said vehicle in frictionless spaced relation from said roadbed, driving means on said vehicle including wheels engaging said rail in laterally opposed relation, motor means operable to impart rotation to said wheels to propel said vehicle along the path defined by said rail, and means associated with said driving means and said vehicle operable to stabilize said vehicle in transverse relation to said rail.

7. A transit system comprising, a substantially flat roadbed, a horizontally extending rail embedded in said roadbed and projecting vertically thereabove, a vehicle movable over said roadbed in the path defined by said rail, said vehicle including a pair of low unit loading air bearings disposed at opposite sides of said rail, said bearings extending longitudinally of the vehicle substantially the entire length thereof in proximate relation to said roadbed, air flow generating means on said vehicle for energizing said air bearings to support said vehicle in frictionless spaced relation from said roadbed, driving means at each end of said vehicle including wheels engaging said rail in laterally opposed relation, motor means operable to impart rotation to said wheels to propel said vehicle along the path defined by said rail, and reaction means associated with said driving means and said vehicle operable to stabilize said vehicle in transverse relation to said rail.

8. A transit system comprising, a substantially flat roadbed, a horizontally extending vertically projecting rail secured to said roadbed, a vehicle movable over said roadbed in the path defined by said rail, said vehicle including a pair of low unit loading air bearings disposed at opposite sides of said rail in proximate relation to said roadbed, air flow generating means for energizing said air bearings to support said vehicle in frictionless spaced relation from said roadbed, a pair of levers pivotally mounted on each end of said vehicle for movement in a horizontal plane, wheels rotatably mounted on said levers engaging said rail in laterally opposed relation, motor means operable to impart rotation to said wheels to propel said vehicle along the path defined by said rail, and elastic means reacting between said levers and said vehicle operable to impose frictional contact between said wheels and said rail and to stabilize said vehicle in transverse relation to said rail.

9. A transit system comprising, a substantially flat roadbed, a horizontally extending vertically projecting rail secured to said roadbed, a vehicle movable over said roadbed in the path defined by said rail, said vehicle including a pair of low unit loading air bearings disposed at opposite sides of said rail in proximate relation to said roadbed, air flow generating means for energizing said air bearings to support said vehicle in frictionless spaced relation from said roadbed, a pair of levers pivotally mounted on each end of said vehicle for movement in a horizontal plane, wheels rotatably mounted on said levers engaging said rail in laterally opposed relation, electric motor means operable to impart rotation to said wheels to propel said vehicle along the path defined by said rail, elastic means reacting between said levers and said vehicle operable to impose frictional contact between said wheels and said rail and to stabilize said vehicle in transverse relation to said rail, electric power conductor means formed on said rail, and power pick-up means on said vehicle movably engaging said conductor means.

10. The structure set forth in claim 9 wherein said conductor means comprises insulated power strips secured in laterally oppositely facing relation on said rail.

11. The structure set forth in claim 10 wherein said pick-up means comprises transversely oppositely biased arms hinged on said vehicle.

References Cited in the file of this patent

UNITED STATES PATENTS

| | | |
|---|---|---|
| 720,291 | Smith | Feb. 10, 1903 |
| 1,015,140 | Cordero | Jan. 16, 1912 |
| 1,091,853 | Lewis | Mar. 31, 1914 |
| 2,394,168 | Goga | Feb. 5, 1946 |
| 2,836,129 | Jaeger | Mar. 27, 1958 |
| 2,958,743 | Moore | Nov. 1, 1960 |
| 3,056,359 | Fey | Oct. 2, 1962 |
| 3,060,867 | Holmquist | Oct. 30, 1962 |
| 3,096,728 | Amann et al. | July 9, 1963 |